United States Patent
Bell

(10) Patent No.: US 6,701,443 B1
(45) Date of Patent: Mar. 2, 2004

(54) METHODS AND APPARATUS FOR DISCOVERING A POWERABILITY CONDITION OF A COMPUTER NETWORK

(75) Inventor: Robert Bell, Bountiful, UT (US)

(73) Assignee: Cisco Technology, Inc., San Jose, CA (US)

( * ) Notice: Subject to any disclaimer, the term of this patent is extended or adjusted under 35 U.S.C. 154(b) by 568 days.

(21) Appl. No.: 09/596,679

(22) Filed: Jun. 19, 2000

(51) Int. Cl.$^7$ ................................................ G06F 1/26
(52) U.S. Cl. ........................ 713/300; 713/300; 713/310; 713/340; 700/22; 700/286
(58) Field of Search ................................ 713/300, 310, 713/340; 700/22–286

(56) References Cited

U.S. PATENT DOCUMENTS

| | | | | |
|---|---|---|---|---|
| 5,148,144 A | * | 9/1992 | Sutterlin et al. | 340/310.01 |
| 5,991,885 A | * | 11/1999 | Chang et al. | 713/300 |
| 5,994,998 A | * | 11/1999 | Fisher et al. | 340/310.01 |
| 6,016,519 A | * | 1/2000 | Chida et al. | 710/19 |
| 6,115,468 A | * | 9/2000 | De Nicolo | 379/413 |
| 6,140,911 A | | 10/2000 | Fisher et al. | 340/310.01 |
| 6,175,556 B1 | | 1/2001 | Allen, Jr. et al. | 370/293 |
| 6,246,748 B1 | * | 6/2001 | Yano | 379/2 |
| 6,348,874 B1 | * | 2/2002 | Cole et al. | 340/825.01 |
| 6,366,143 B1 | * | 4/2002 | Liu et al. | 327/142 |
| 6,393,050 B1 | * | 5/2002 | Liu | 375/219 |
| 6,496,103 B1 | * | 12/2002 | Weiss et al. | 340/310.01 |
| 6,535,983 B1 | * | 3/2003 | McCormack et al. | 713/310 |

FOREIGN PATENT DOCUMENTS

EP 0777357 A2 * 4/1997

* cited by examiner

Primary Examiner—Thomas Lee
Assistant Examiner—Nitin C. Patel
(74) Attorney, Agent, or Firm—Chapin & Huang, L.L.C.; David E. Huang, Esq.

(57) ABSTRACT

The invention is directed to techniques for discovering a powerability condition of a computer network such as the existence of a remotely powerable device attached to a connecting medium of the computer network. Such detection can then control whether a remote power source (e.g., a data communications device such as a switch) provides remote power (e.g., phantom power) to the computer network. One arrangement of the invention is directed to an apparatus for discovering a powerability condition of a computer network. The apparatus includes a signal generator, a detector and a controller which is coupled to the signal generator and the detector. The controller configures the signal generator to provide a test signal to a connecting medium of the computer network, and configures the detector to measure a response signal from the connecting medium of the computer network. The controller then indicates whether a remotely powerable device connects to the connecting medium of the computer network based on the response signal. Accordingly, if the apparatus discovers a remotely powerable device attached to the computer network (i.e., the power requirement condition of the network), the apparatus can provide power to the device remotely (e.g., through the connecting medium). However, if the apparatus does not discover a remotely powerable device attached to the computer network (e.g., another power requirement condition), the apparatus can avoid providing power remotely and thus avoid possibly damaging any non-remotely powerable device on the computer network.

15 Claims, 9 Drawing Sheets

METHODS AND APPARATUS FOR DISCOVERING A POWERABILITY CONDITION OF A COMPUTER NETWORK

BACKGROUND OF THE INVENTION

There is a wide variety of data communications networks suitable for carrying data between devices. For example, Ethernet is a widely used architecture for local-area networks (LANs). The architecture for such a computer network, along with variants defined in the IEEE 802.3 standard, is the result of work performed at a variety of companies.

Initially, the purpose of an 802.3 network was to carry data communications exclusively. All of the devices attached to such a computer network included their own power supplies and derived power from these power supplies. Accordingly, each device operated as a standalone system with unlimited local power.

Today, there exists a wide range of devices for which remote powerability is highly desirable. For example, it would be convenient if certain devices, which can attach to an 802.3 network, could draw power from the 802.3 network in order to operate properly. Examples of such devices include Internet telephones (IP phones) and security/surveillance devices.

SUMMARY OF THE INVENTION

Unfortunately, if a power source (e.g., a power supply) simply applies power to an 802.3 computer network in order to power a remotely powerable device on that network, there is a high risk of damaging any non-remotely powerable device on the network, i.e., a device which does not require and draw remote power. A conventional non-remotely powerable device typically includes circuitry (e.g., a network termination circuit) that is unable to handle power provided over a computer network. In the event of remote power application, such circuitry can overheat or burn out resulting in permanent damage to the non-remotely powerable device.

Furthermore, applying power to a computer network that does not require such power runs the risk of creating adverse conditions within the computer network itself. For example, applying power to an 802.3 network runs the risk of generating broadcast firestorms within the 802.3 network.

In contrast, the invention is directed to techniques for discovering a powerability condition of a computer network such as the existence of a remotely powerable device attached to a connecting medium of the computer network. Such detection can then control whether a remote power source (e.g., a data communications device such as a switch, or a mid-span device such as a patch panel) provides remote power to the computer network (e.g., phantom power from a VDC power source connected to digital communication lines of the network, direct power, etc.).

One arrangement of the invention is directed to an apparatus for discovering a powerability condition of a computer network. The apparatus includes a signal generator, a detector, and a controller which is coupled to the signal generator and the detector. The controller configures the signal generator to provide a test signal to a connecting medium of the computer network, and configures the detector to measure a response signal from the connecting medium of the computer network. The controller then indicates whether a remotely powerable device connects to the connecting medium of the computer network based on the response signal. Accordingly, if the apparatus discovers a remotely powerable device attached to the computer network (i.e., a powerability condition of the network), the apparatus can provide power to the device remotely (e.g., through the connecting medium). However, if the apparatus does not discover a remotely powerable device attached to the computer network (e.g., another powerability condition of the network), the apparatus can avoid providing power remotely and thus avoid possibly damaging any non-remotely powerable devices on the computer network.

In one arrangement, the computer network supports connection of a remotely powerable device that receives, during normal operation, an operating voltage having a first voltage magnitude. Here, the controller configures the signal generator to supply, as the test signal, a test voltage having a second voltage magnitude that is substantially less than the first voltage magnitude. Accordingly, if there is no remotely powerable device connecting to the computer network but there is a non-remotely powerable device that connects to the computer network, the current resulting from the application of the second (lower magnitude) test voltage is less likely to cause damage to the non-remotely powerable device compared to the current that would result from the application of the first (higher magnitude) test voltage.

In one arrangement, the controller configures the signal generator to supply, to the connecting medium, (i) a first voltage during a first time period, and (ii) a second voltage that is substantially different than the first voltage during a second time period. Preferably, the controller configures the signal generator to apply one of a positive and negative test voltage to the connecting medium as the first voltage (e.g., −5 volts), and the other of the positive and negative test voltage to the connecting medium as the second voltage (e.g., +5 volts). This arrangement enables the controller to determine whether a remote device, which allows current to flow when in only one direction (e.g., a remotely powerable device), connects to the computer network and, if so, whether that device is properly connected (or reverse-wired).

In one arrangement, the connecting medium includes (i) a first connecting link having a local end that terminates at a first transformer and a remote end, and (ii) a second connecting link having a local end that terminates at a second transformer and a remote end. In this arrangement, the controller preferably configures the signal generator to apply the test signal to the connecting medium through a centertap of the first transformer and a centertap of the second transformer. This arrangement is particularly advantageous in 802.3 networks since such networks typically use centertapped transformers thus enabling the invention to utilize existing network-related components.

In one arrangement, the connecting medium includes a local end and a remote end. Preferably, the controller selectively identifies, through the local end of the connecting medium, one of (i) a backwards wired device condition at the remote end, (ii) an open condition at the remote end, (iii) a remotely powerable device condition at the remote end, and (iv) a shorted/non-powerable device condition at the remote end. Accordingly, the controller can distinguish between a variety of computer network conditions (i.e., powerability conditions).

One arrangement of the invention is directed to a data communications device (e.g., a switch, a hub, a router, a bridge, etc.) or other device (e.g., a patch panel) that includes normal operating circuitry which communicates with a remote device over a computer network during normal operation, and power circuitry coupled to the normal operating circuitry. In this arrangement, the power circuitry, which is capable of discovering whether the remote device is remotely powerable over the computer network, is built into the data communications device itself.

Another arrangement of the invention is directed to a remotely powerable device having normal operating circuitry which couples to a connecting medium of a computer network, and a powerability indicator which couples to the normal operating circuitry. The powerability indicator is capable of receiving a test signal from the connecting medium of the computer network, and providing a response signal to the connecting medium of the computer network to enable discovery of the remotely powerable device based on the response signal.

Another arrangement of the invention is directed to a computer program product that includes a computer readable medium having instructions stored thereon for discovering a powerability condition of a computer network. The instructions, when carried out by a processor, cause the processor to perform the steps of: (i) providing a test signal to a connecting medium of the computer network; (ii) measuring a response signal from the connecting medium of the computer network; and (iii) determining whether a remotely powerable device connects to the connecting medium of the computer network based on the response signal.

The features of the invention, as described above, may be employed in data communications devices and other computerized devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

A remotely powerable device is a device which requires and draws power from a remote power source for normal operation. The invention is directed to techniques for discovering a powerability condition of a computer network such as the existence of a remotely powerable device attached to a connecting medium of the network. Such detection can then control whether a remote power source (e.g., a data communications device such as a switch) provides remote power (e.g., phantom power or direct power) to the network. That is, if it is determined that a remotely powerable device is attached to the network, the remote power source can provide power to the device remotely (e.g., through the connecting medium). However, if no remotely powerable device is discovered, the remote power source can avoid providing power remotely, and thus avoid possibly damaging any non-remotely powerable devices on the network. Such techniques may be employed in data communications devices and other computerized devices such as those manufactured by Cisco Systems, Inc. of San Jose, Calif.

Figure 1:
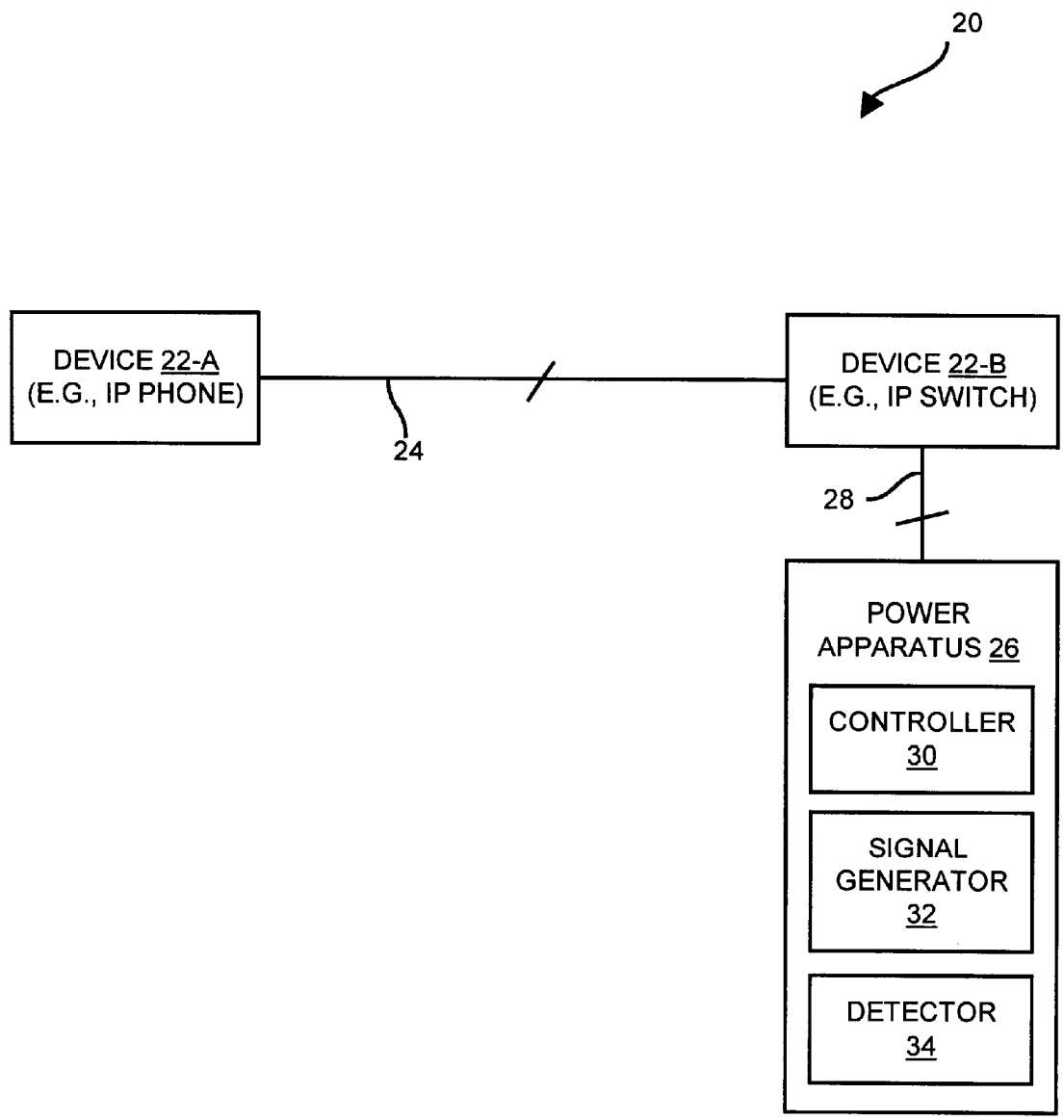
FIG. 1 is a block diagram showing a remote powerability system which is suitable for use by the invention.

FIG. 1 shows a remote powerability system 20 which is suitable for use by the invention. The system 20 is a computer network which includes a device 22-A (e.g., an IP phone) and a device 22-B (e.g., an IP switch). The devices 22-A, 22-B (collectively, devices 22) communicate with each other through a connecting medium 24. In one arrangement, the devices 22 include physical layer devices (PHY), and the connecting medium 24 includes a Medium Dependent Interface (MDI) having multiple lines for carrying signals between the devices 22 (e.g., 10BaseT, 100BaseT, etc.). The system 20 further includes a power apparatus 26 which connects with the device 22-B through connections 28. The power apparatus 26 includes a controller 30, a signal generator 32 and a detector 34. Further details of the invention will now be discussed with reference to FIG. 2.

Figure 2:
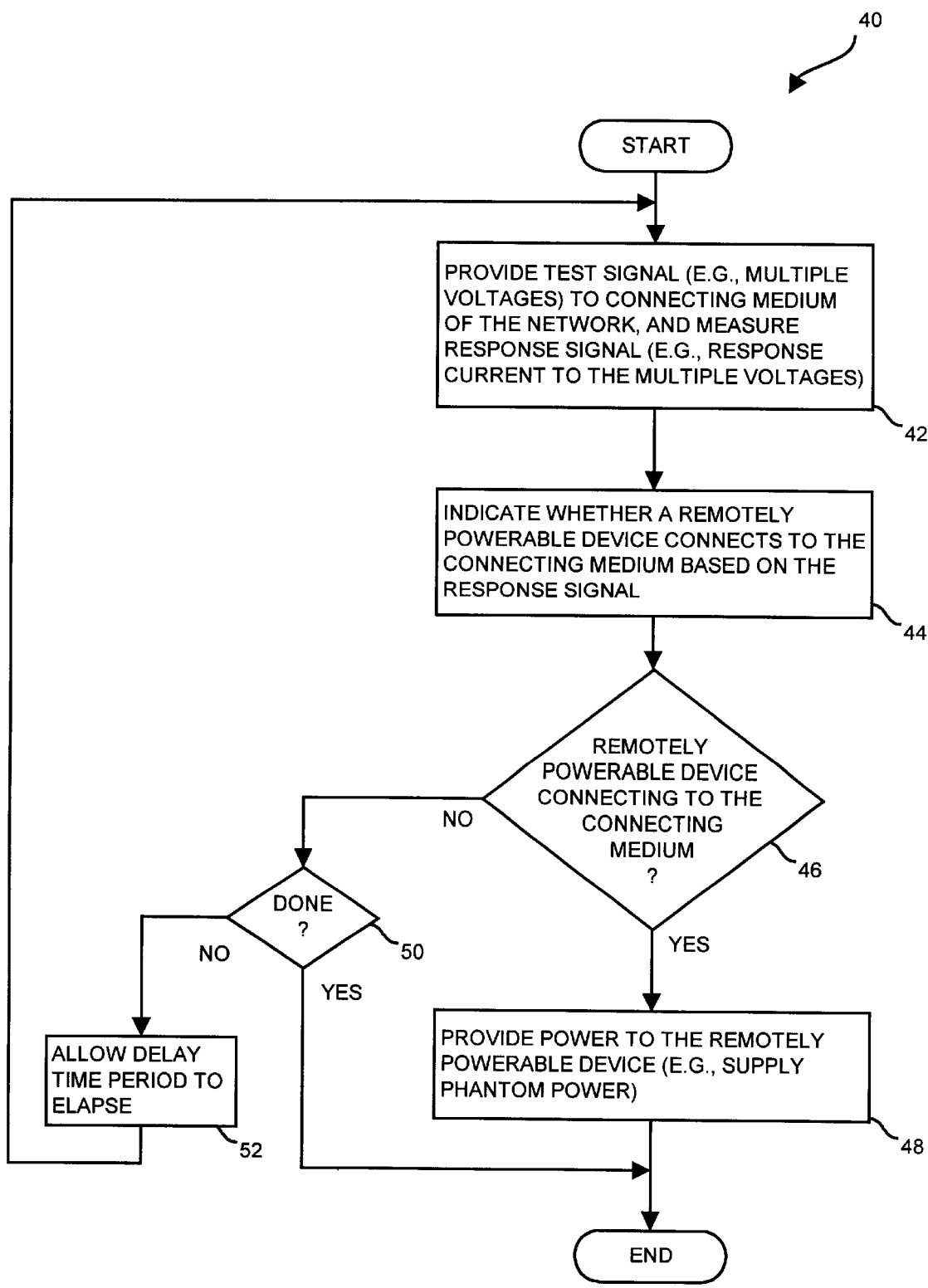
FIG. 2 is a flow diagram illustrating a procedure performed by a power apparatus of FIG. 1.

FIG. 2 shows a procedure 40 which is performed by the power apparatus 26 in order to discover a powerability condition of the system 20 of FIG. 1. In particular, the power apparatus 26 performs the procedure 40 to determine whether the device 22-A is remotely powerable.

In step 42, the apparatus 26 provides a test signal (e.g., multiple voltages) to the connecting medium 24, and measures a response signal (e.g., current in response to the multiple voltages). In particular, the controller 30 configures the signal generator 32 to provide the test signal to the connecting medium 24 of the system 20 through the device 22-B. Additionally, the controller 30 configures the detector 34 to measure the response signal from the connecting medium 24 through the device 22-B.

In step 44, the apparatus 26 indicates whether a remotely powerable device connects to the connecting medium 24 based on the response signal. In particular, the controller 30 stores an indication signal result of the detector 34 which is based on the response signal. The indication signal result indicates whether the device 22-A is a remotely powerable device.

In step 46, the apparatus 26 proceeds to step 48 if it discovers that a remotely powerable device connects to the connecting medium 24. Otherwise (i.e., if the apparatus 26 does not discover a remotely powerable device connecting to the connecting medium 24), the apparatus 26 proceeds to step 50.

In step 48, when the apparatus 26 has discovered that the device 22-A is remotely powerable, the apparatus 26 provides power to the device 22-A. As will be explained in further detail later, the apparatus 26 preferably provides phantom power to the device 22-A through the connecting medium 24. The apparatus 26 then terminates the procedure 40.

In step 50, when the apparatus 26 has not discovered a remotely powerable device connecting to the system 20, the apparatus 26 determines whether it should continue operation. If not, the apparatus 26 terminates the procedure 40 (e.g., in response to a shutdown or reset command). If the apparatus 26 determines that it should continue operation, the apparatus 26 proceeds to step 52.

In step 52, the apparatus 26 allows a delay time period to elapse, and then proceeds back to step 42 to repeat the procedure 40. In one arrangement, the apparatus 26 waits a relatively short period of time (e.g., one to two minutes) before proceeding In back to step 42.

Figure 3:
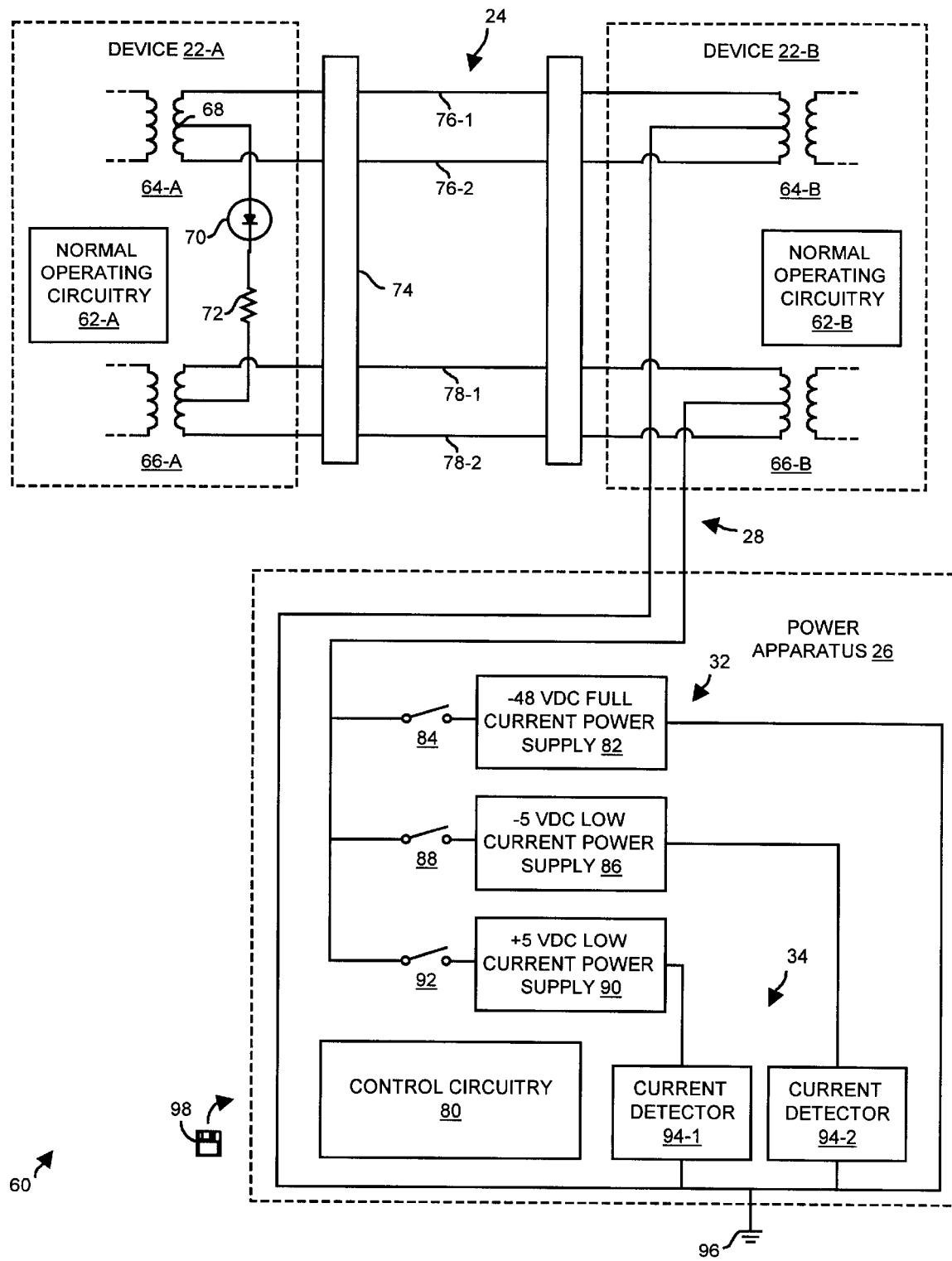
FIG. 3 is a block diagram showing an arrangement of components which is suitable for use for forming a portion of the remote powerability system of FIG. 1.

FIG. 3 is a block diagram showing, by way of example only, an arrangement 60 of components which is suitable for use for the remote powerability system 20 of FIG. 1. Each device 22 includes normal operating circuitry 62 and a set of transformers 64, 66. Each transformer 64, 66 includes a centertap 68 that divides a portion of the transformer 64,66 into an upper coil and a lower coil, and provides direct access to the connecting medium 24.

The invention relies on distinguishing connection attributes between (i) a remotely powerable device at a remote end of a network connection, (ii) a reverse-wired remotely powerable device at a remote end of a network connection, (iii) an open condition at a remote end of a network connection, and (iv) a non-remotely powerable device at a remote end of a network connection or a short in the network connection. In one arrangement, the remotely powerable device allows current to flow in only one direction through the network connection, the reverse-wired remotely powerable device allows current to flow only in the opposite direction, the open condition prevents current from flowing in either direction, and the non-remotely powerable device/shorted-condition allows current to flow in both directions.

As shown in FIG. 3, the device 22-A is a remotely powerable device which includes a powerability indicator formed by a diode 70 and a resistor 72 connected in series between the centertaps 68 of the transformers 64-A and 66-A. The powerability indicator provides, in response to a test signal, a response signal to the connecting medium 24 indicating that the device 22-A is remotely powerable. In particular, the powerability indicator allows current to flow in only one direction (i.e., from the transformer 64-A to the transformer 66-A) which uniquely characterizes the device 22-A as a remotely powerable device. In contrast, non-remotely powerable devices typically allow current flow in both directions.

As further shown in FIG. 3, the power apparatus 26 connects to the centertaps 68 of the transformers 64-B and 66-B of the device 22-B through the connections 28. The power apparatus 26 provides the test signal to the connecting medium 24 and receives the response signal from the connecting medium 24 through these connections 28 and the centertaps 68 of these transformers 64-B and 66-B.

The connecting medium 24 includes multiple lines 76, 78. In one arrangement, the connecting medium 24 uses 802.3 based technology (e.g., 10BaseT, 100BaseT, etc.). In this arrangement, the connecting medium 24 (e.g., Category 5 cabling) includes twisted pair wiring 76-1, 76-2 (e.g., for carrying a differential signal pair between the device 22-A and the device 22-B) and twisted pair wiring 78-1, 78-2 (e.g., for carrying a differential signal pair between the device 22-B and the device 22-A). The connecting medium 24 connects to the devices 22 through connectors 74 (e.g., RJ45 plugs and adaptors). When the remotely powerable device 22-A is properly connected to the connecting medium 24, the powerability indicator of the remotely powerable device 22-A (the diode 70) allows current to flow only in one direction, from lines 76-1, 76-2 to lines 78-1, 78-2.

The power apparatus 26, as shown in FIG. 3, includes control circuitry 80 and several direct current (DC) power supplies and switches. In particular, the power apparatus 26 includes a −48 volt (V) DC power supply 82 which is controllable by a switch 84, a −5 VDC power supply 86 which is controllable by a switch 88, and a +5 VDC power supply 90 which is controllable by a switch 92. The control circuitry 80 and switches 84, 88 and 92 form the controller 30 (see FIG. 1). The power supplies 82, 86 and 90 form the signal generator 32 (again, see FIG. 1). The power apparatus 26 further includes current detectors 94-1 and 94-2 which form the detector 34 (FIG. 1).

The control circuitry 80 is capable of selectively supplying −48 volts, −5 volts and +5 volts to the connecting medium 24 by operating the switches 84, 88 and 92. In particular, when the control circuitry 80 opens switches 84, 92 and closes the switch 88, the power supply 86 provides −5 volts to the connecting medium 24 in order to measure a current response (the response signal). Similarly, when the control circuitry 80 opens switches 84, 88 and closes the switch 92, the power supply 90 provides +5 volts to the connecting medium 24 in order to measure another current response. Additionally, when the control circuitry 80 opens switches 88, 92 and closes the switch 84, the power supply 82 provides −48 volts to the connecting medium 24 in order to provide phantom power to the device 22-A which connects to the remote end of the connecting medium 24. It should be understood that the devices 22-A and 22-B can communicate with each other through the connecting medium 24 using differential pair signals while the power supply 82 applies power to the device 22-A through the connecting medium 24, i.e., while the device 22-A draws phantom power from the power apparatus 26 through the connecting medium 24.

Furthermore, it should be understood that the power supplies 86, 90 are preferably low current power supplies, i.e., capable of limiting the current to less than an amp (e.g., 25–30 milliamps) in order to prevent damaging any non-remotely powerable devices connecting to the connecting medium 24.

In one arrangement, the control circuitry 80 includes a data processing device or processor. Here, a computer program product 98 (e.g., one or more CDROMs, tapes, diskettes, etc.) provides instructions which direct the operation of the processor. Alternatively, the processor acquires the instructions through other means, e.g., via a network download through the device 22-B, or has non-volatile storage associated with the processor (e.g., ROM, flash memory, etc.). Further details of the operation of the remote power system 20 will now be provided with reference to FIGS. 4 and 5.

Figure 4:
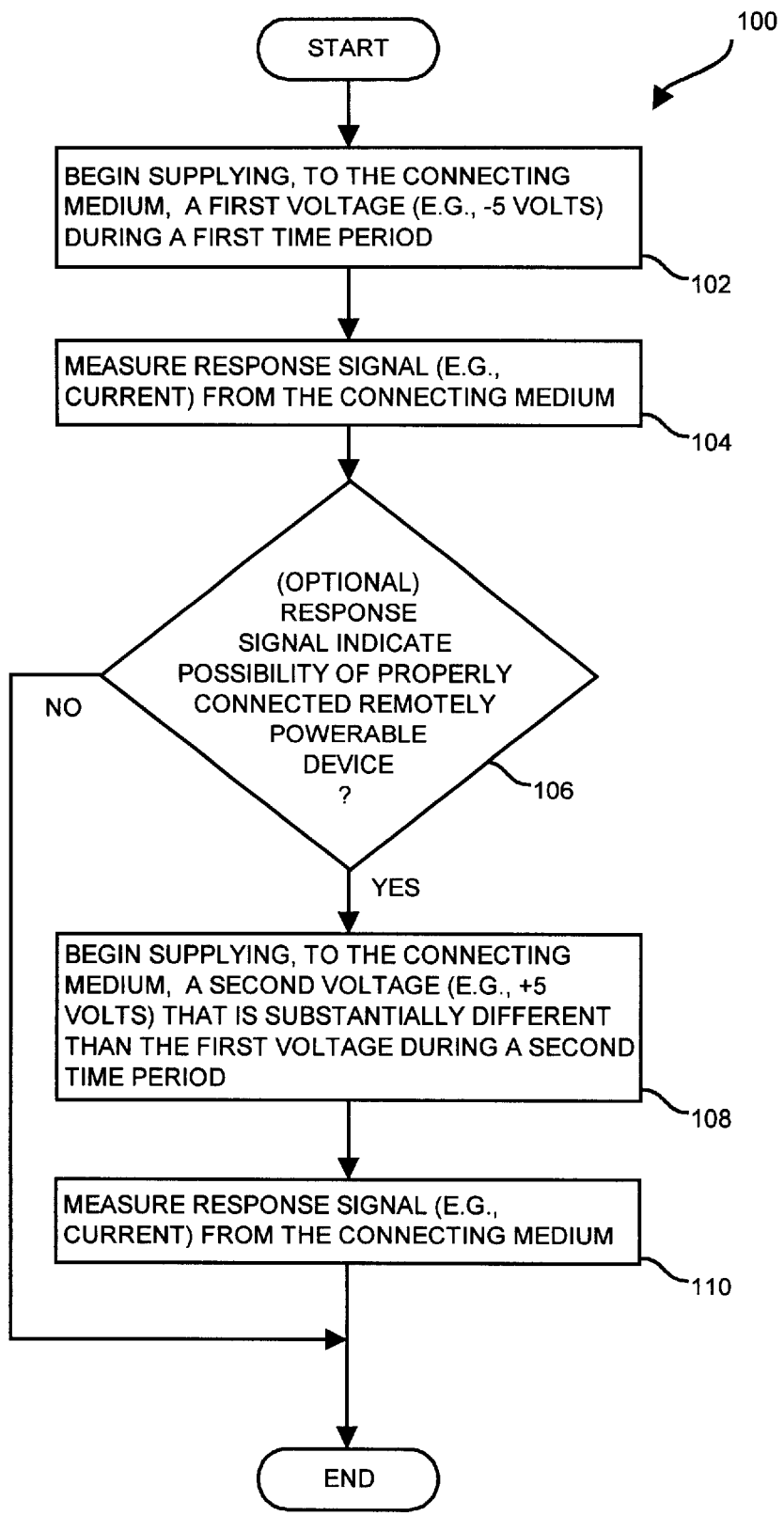
FIG. 4 is a flow diagram illustrating a procedure which is suitable for use as a step of providing a test signal and measuring a response signal of FIG. 2.

FIG. 4 shows a procedure 100 which is suitable for use as step 42 of the procedure 40 (FIG. 2) performed by the power apparatus 26. The procedure 100 involves providing a test signal (e.g., multiple voltages) to the connecting medium 24 and measuring a response signal (e.g., current).

In step 102, the power apparatus 26 begins supplying, to the connecting medium 24, a first voltage during a first time period. In particular, the control circuitry 80 closes the switch 88 for 100 milliseconds such that the −5 VDC power supply 86 applies −5 volts across the centertaps 68 of the transformers 64-B and 66-B. As a result, −5 volts appears across the diode 70 of the device 22-A which reverse biases the diode 70.

Figure 5:
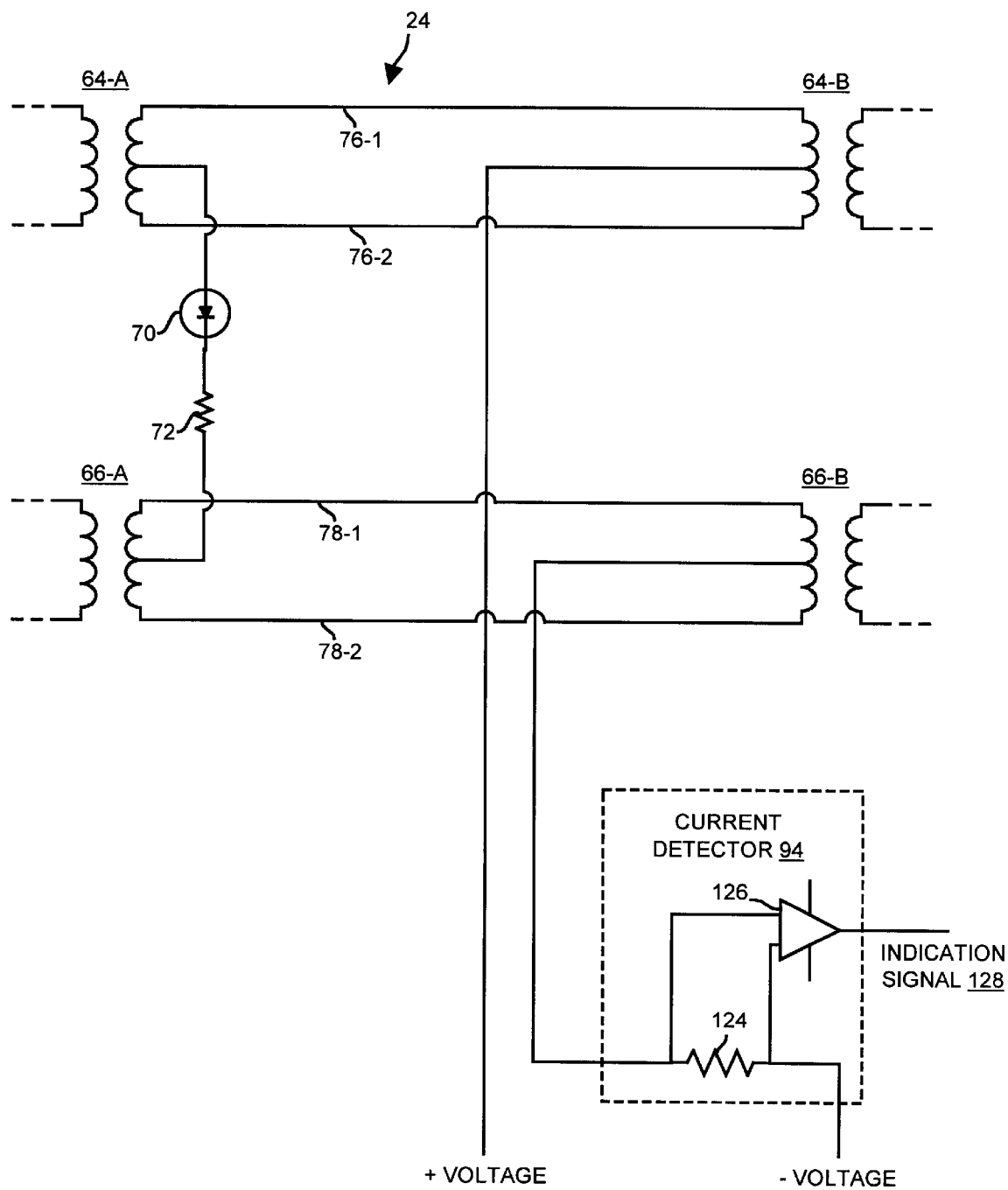
FIG. 5 is a circuit diagram showing certain circuit element details which are suitable for use in particular components of FIG. 3.

In step 104 and during the first time period, the power apparatus 26 measures current through the connecting medium 24. In particular, the control circuitry 80 activates the current detector 94-2 to determine whether current flows through the connecting medium 24. Since the diode 70 is reversed biased, no current flows through the connecting medium 24, and the control circuitry 80 detects no current flow. FIG. 5 shows a circuit diagram having circuit elements which are suitable for use for the current detector 94-2.

In one arrangement, the procedure 100 does not include step 106 and step 104 proceeds to step 108. However, in another arrangement, the procedure 100 includes step 106 which allows the power apparatus 26 to terminate the procedure 100 if it determines that there is no remotely powerable device properly connecting to the connecting medium 24. In particular, in step 106, the power apparatus 26 determines whether the response signal indicates that a properly connected remotely powerable device possibly exists on the connecting medium 24. If so, step 106 proceeds to step 108. If not, the procedure 100 terminates.

In step 108, the power apparatus 26 begins supplying, to the connecting medium 24, a second voltage during a second time period. In particular, the control circuitry 80 of the power apparatus 26 closes the switch 92 for 100 milliseconds such that the +5 VDC power supply 90 applies +5 volts across the centertaps 68 of the transformers 64-B and 66-B. As a result, +5 volts appears across the diode 70 of the device 22-A which forward biases the diode 70.

In step 110 and during the second time period, the power apparatus 26 measures current through the connecting medium 24. In particular, the control circuitry 80 activates the current detector 94-1 to determine whether current flows through the connecting medium 24. Since the diode 70 is forward biased, current flows through the connecting medium 24, and the control circuitry 80 detects this current flow. The circuit diagram of FIG. 5 includes circuit elements which are suitable for use for the current detector 94-1.

After step 110, the procedure 100 terminates. The results of the procedure 100 can be used by the control circuitry 80 to determine whether to provide power to the connecting medium 24. For example, the characteristic of allowing current to flow in only one direction from lines 76 to lines 78 (FIG. 3) indicates that the device 22-A is a remotely powerable device. Accordingly, during steps 46 and 48 of FIG. 2, the power apparatus 26 provides phantom power to the remotely powerable device 22-A through the connecting medium 24.

As stated above, FIG. 5 shows a circuit diagram which includes circuitry which is suitable for use for each of the current detectors 94-1 and 94-2. The current detector 94 includes a resistor 124 and a comparator 126 having its inputs connected to the ends of the resistor 124. Accordingly, as current flows through the connecting medium 24 and through the resistor 124, the potential difference across the resistor 124 is applied to the inputs of the comparator 126. The comparator 126 provides an indication signal 128 indicating whether the potential difference exceeds a predetermined voltage threshold, i.e., whether there is current flow through the connecting medium 24.

It should be understood that one skilled in the art can select a suitable value for the resistor 124 (e.g., 10 ohms) in order to properly generate the indication signal 128. For example, suppose that each transformer 64, 66 provides approximately 20 ohms of resistance so that each half coil provides 10 ohms of resistance. Further suppose that the connecting medium is 26 gauge medium hardness wire having a resistance of 42.4 ohms per foot and that the maximum length of the connecting medium 24 is 100 meters (approx. 328 feet) thus translating into a maximum resistance per wire of 13.9 ohms. The resulting resistance from the power apparatus 26, through the transformer 64-B (5 ohms), through the wires 76 (6.95 ohms), through the transformer 64-A (5 ohms), through the diode 70 (31 ohms if the current is limited to about 25 milliamps), through the resistor 72 (100 ohms), through the transformer 66-A (5 ohms), through the wires 78 (6.95 ohms), through the transformer 66-B (5 ohms), and through the resistor 124 (10 ohms) is 174.9 ohms. If the applied voltage is −5 volts, the current flow is approximately 28.6 milliamps (−5 volts divided by 174.9 ohms). Accordingly, the voltage drop across the sensing resistor 124 approximately 286 millivolts (10 ohms times 28.6 milliamps) which is a value that is easily detectable by the comparator 126 in order to properly provide the indication signal 128.

Additionally, it should be understood that the power apparatus 26 is capable of discovering other powerability conditions of the system 20 of FIG. 1, i.e., of the computer network. In particular, the power apparatus 26 can determine (i) when there is no device connecting to the connecting medium 24 at the remote end, (ii) when there is a reverse-wired remotely powerable device connecting to the connecting medium 24 at the remote end, and (iii) when there is a shorted condition or non-remotely powerable device connected to the connecting medium 24 at the remote end. As stated above, when there is no device at the remote end of the connecting medium 24, there is no possible current flow through the connecting medium 24 in either direction. When there is a reverse-wired remotely powerable device at the remote end of the connecting medium 24, there is current flow when only in one direction which is opposite to the direction of current flow for a properly connected remotely powerable device. When there is a short in the connecting medium 24 or a non-remotely powerable device at the remote end, current is capable of flowing in both directions. Further details of how the power apparatus 26 makes such determinations will now be provided with reference to FIGS. 6A, 6B and 6C.

Figure 6A:
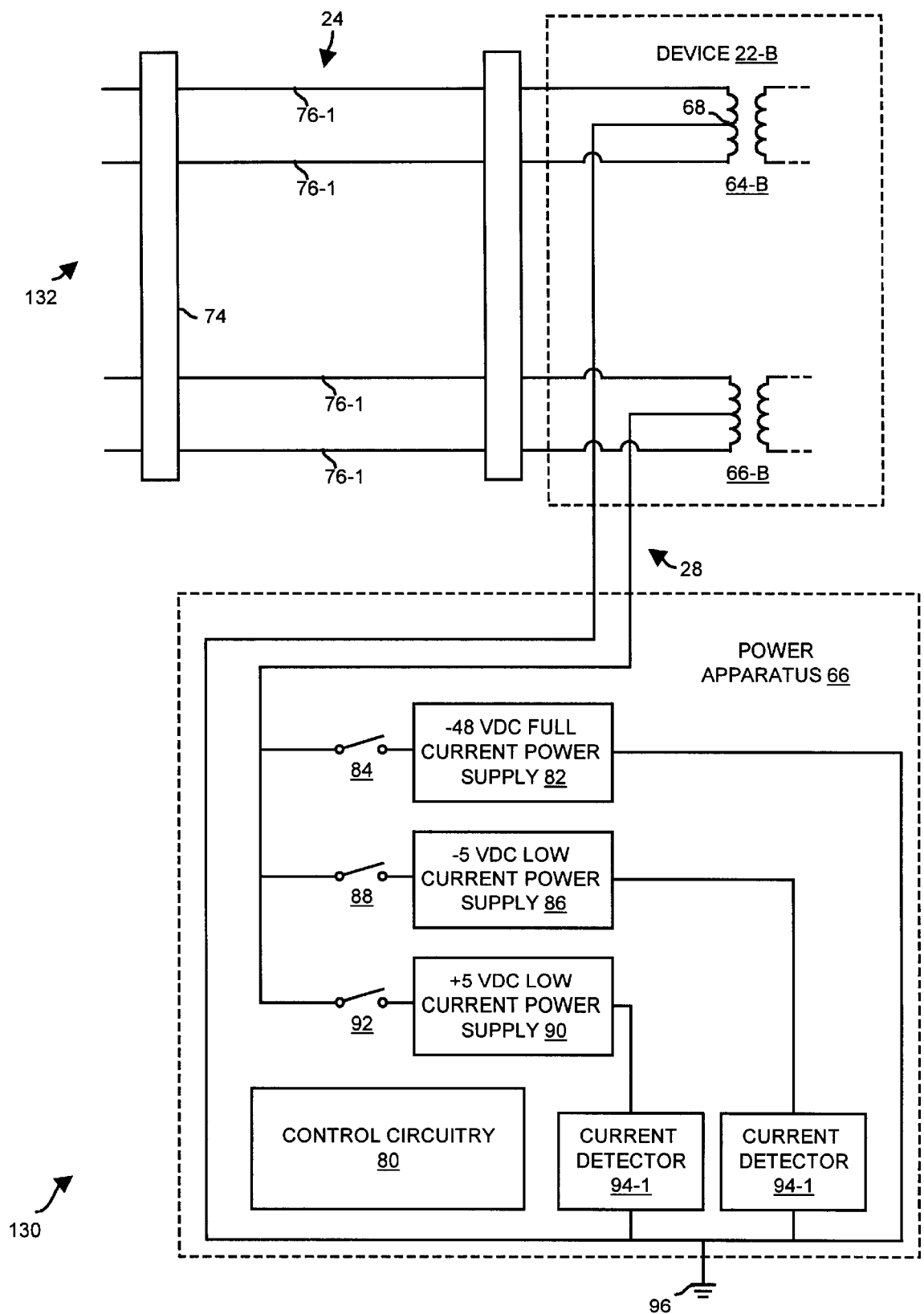
FIG. 6A is a block diagram showing a component arrangement having an open condition for comparison to the arrangement of FIG. 3.

FIG. 6A shows an arrangement 130 in which there is no device at the remote end of the connecting medium 24, and in which an open condition 132 exists at the remote end of the connecting medium 24. Accordingly, current cannot flow in either direction through the connecting medium 24.

For the arrangement 130, the power apparatus 26 performs the procedure 40 (FIG. 2). In step 42 of the procedure 42, the power apparatus 26 provides a test signal to the connecting medium 24, and measures a response signal. In particular, the power apparatus 26 performs the procedure 100 for step 42 (FIG. 4). That is, the power apparatus 26 supplies −5 volts to the connecting medium 24 (step 102). Since no current flows through the connecting medium 24 due to the open condition 132 at the remote end, the power apparatus 26 measures no current flow (step 104).

Recall that if the remotely powerable device 22-A were properly connected to the remote end of the connecting medium 24 (FIG. 3), the power apparatus 26 would also detect no current flow due to the reverse biasing of the diode 70 of the device 22-A. Since the power apparatus 26 cannot yet distinguish between the open condition 132 and a presence of a remotely powerable device 22-A, the power apparatus 26 does not yet conclude that the open condition 132 exists at the remote end.

The power apparatus then supplies +5 volts to the connecting medium 24 (step 108 of FIG. 4). Again, the power apparatus 26 measures no current flow (step 110), since no current flows through the connecting medium 24 due to the open condition 132 at the remote end. If a remotely powerable device 22-A had been connected to the connecting medium 24 at the remote end, current would have flowed through the connecting medium 24 and the device 22-A. Since the power apparatus 26 detects no current flow in either direction, the power apparatus 26 concludes that there is the open condition 132 at the remote end of the connecting medium 24 and does not supply an operating voltage (e.g., −48 volts) to the connecting medium 24.

Figure 6B:
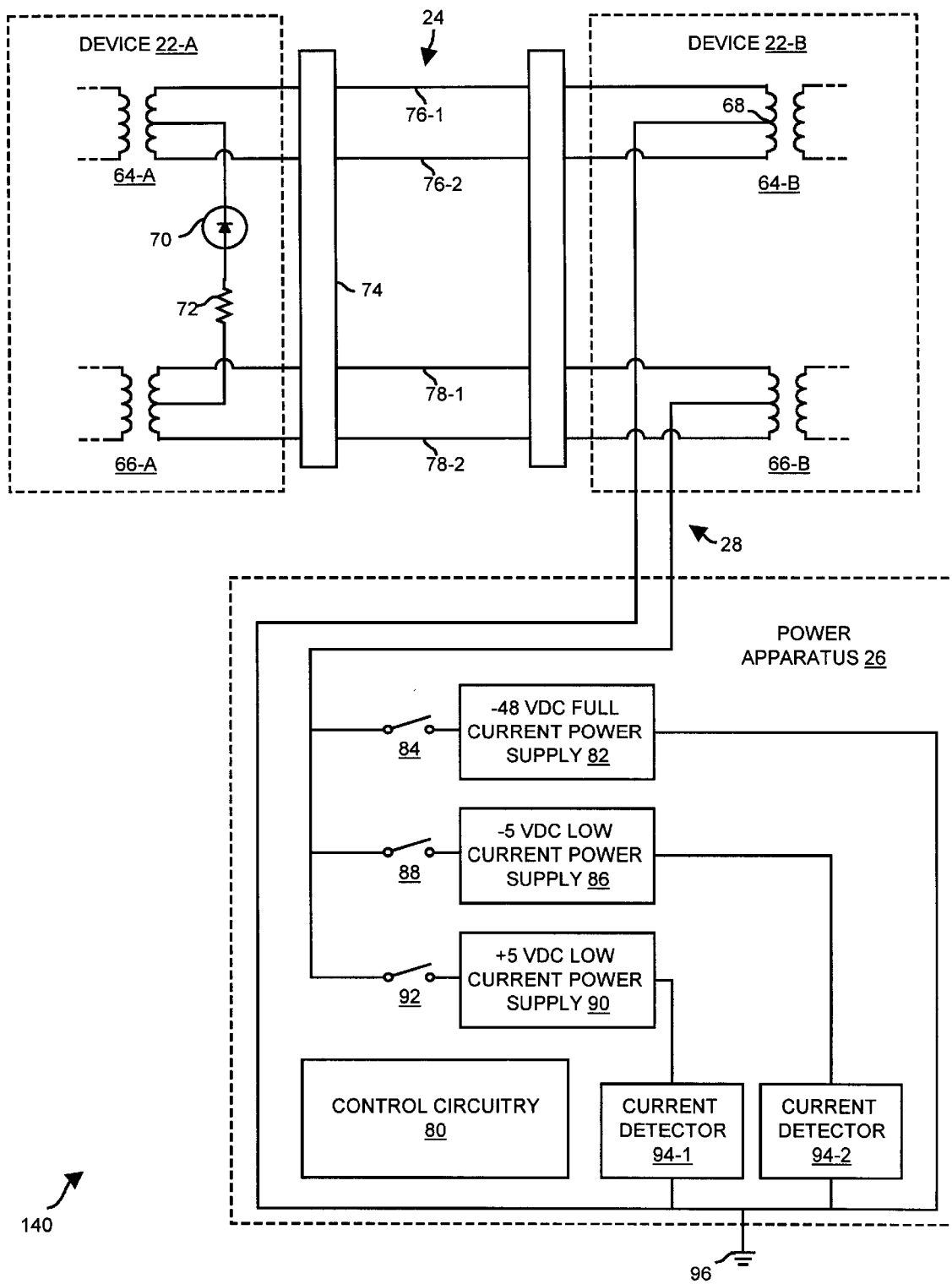
FIG. 6B is a block diagram showing a component arrangement having a backwards wired device condition for comparison to the arrangement of FIG. 3.

FIG. 6B shows an arrangement 140 in which there is a backwards-wired, or reverse-wired, remotely powerable device 22-A at the remote end of the connecting medium 24. Accordingly, current can flow only in one direction which is opposite to the direction of current flow for a properly connected remotely powerable device.

For the arrangement 140, the power apparatus 26 performs the procedure 100 to provide a test signal to the connecting medium 24 and measure a response signal (also see step 42 of FIG. 2). That is, the power apparatus 26 supplies −5 volts to the connecting medium 24 (step 102 of FIG. 4) which forward biases the diode 70 of the reverse-wired remotely powerable device 22-A. Accordingly, current flows through the connecting medium 24, and the power apparatus 26 measures this current flow (step 104). The presence of (i) a short in the connecting medium 24, (ii) a reverse-wired remotely-powerable device 22-A at the remote end, or (iii) a non-remotely powerable device at the remote end could cause current to flow through the connecting medium 24 during this phase.

In contrast, if the remotely powerable device 22-A were properly connected to the remote end of the connecting medium 24 (FIG. 3), the power apparatus 26 would detect no current flow due to the reverse biasing of the diode 70 of the device 22-A. Accordingly, the power apparatus 26 concludes that there is not a properly connected remotely powerable device at the remote end of the connecting medium 24. In one arrangement, the power apparatus 26 terminates the procedure 100 at this point (step 106). In another arrangement, the power apparatus 26 continues the procedure 100.

If the power apparatus 26 continues the procedure 100, the power apparatus 26 supplies +5 volts to the connecting medium 24 (step 108) which reverse biases the diode 70 of the reverse-wired remotely powerable device 22-A. Accordingly, the power apparatus 26 measures no current flow through the connecting medium 24 (step 110). A short in the connecting medium 24 or the presence of a non-remotely powerable device would have resulted in current flow in the connecting medium 24 during this phase. Since the power apparatus 26 detects current flow only in one direction which is opposite to the direction of current flow for a properly connected remotely powerable device, the power apparatus 26 concludes that a reverse-wired remotely powerable device 22-A exists at the remote end of the connecting medium 24.

Figure 6C:
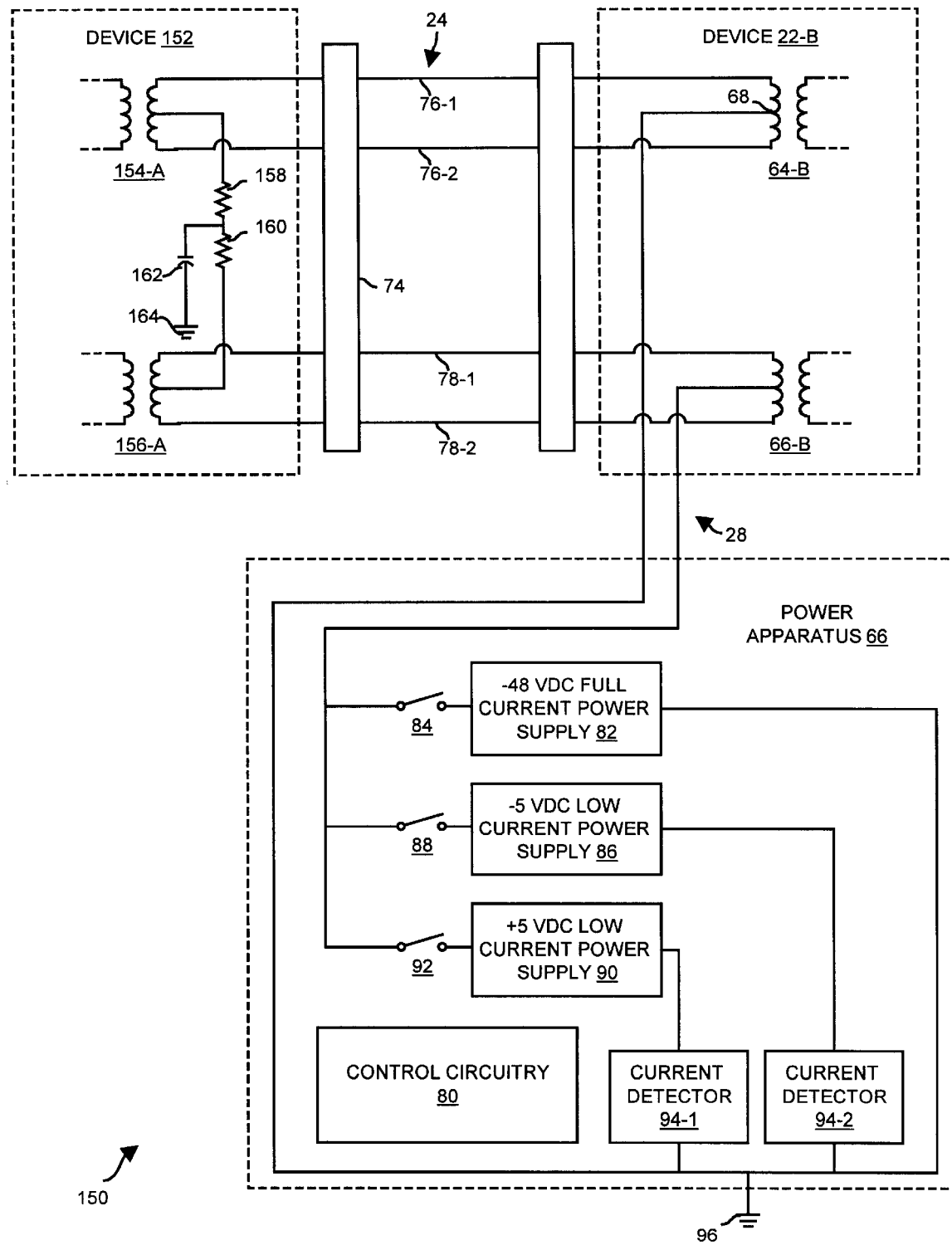
FIG. 6C is a block diagram showing a comparison to the arrangement of FIG. 3.

FIG. 6C shows an arrangement 150 in which there is a non-remotely powerable device 152 at the remote end of the connecting medium 24 (or alternatively a short in the connecting medium 24). The non-remotely powerable device 152 is a conventional device having its own power supply and can be characterized as including transformers 154-A, 156-A, series-connected resistances 158, 160 (e.g., 75 ohms each) between centertaps of the transformers 154-A, 156-A, and a capacitance 162 interconnected between ground 164 and an intermediate node of the series-connected resistances 158, 160. The series-connected resistances allow current to flow in both directions through the connecting medium 24.

For the arrangement 150, the power apparatus 26 performs the procedure 100 to provide a test signal to the connecting medium 24 and measure a response signal (also see step 42 of FIG. 2). In particular, the power apparatus 26 attempts to supply −5 volts to the connecting medium 24 (step 102 of FIG. 4). In response, current flows through the connecting medium 24 and through the series-connected resistances 158, 160, and the power apparatus 26 measures this current flow (step 104).

If the remotely powerable device 22-A were properly connected to the remote end of the connecting medium 24 (FIG. 3), the power apparatus 26 would detect no current flow due to the reverse biasing of the diode 70 of the device 22-A. Accordingly, the power apparatus 26 concludes that there cannot be a properly connected remotely powerable device at the remote end of the connecting medium 24. The cause of the current flow could be (i) a short in the connecting medium 24, (ii) the presence of a reverse-wired remotely powerable device at the remote end of the connecting medium 24, or (iii) the presence of a non-remotely powerable device at the remote end of the connecting medium 24. In one arrangement, the power apparatus 26 terminates the procedure 100 at this point (step 106). In another arrangement, the power apparatus 26 continues the procedure 100.

If the power apparatus 26 continues the procedure 100, the power apparatus 26 supplies +5 volts to the connecting medium 24 (step 108) which, again, results in current flow through the connecting medium 24 and the series connected resistances 158, 160. Accordingly, the power apparatus 26 measures current flow through the connecting medium 24 (step 110). The presence of a reverse-wired remotely powerable device at the remote end of the connecting medium would-have resulted in no current flow during this phase. Since the power apparatus 26 detects current flow in both directions, the power apparatus 26 concludes that there exists either a non-remotely powerable device connected to the connecting medium 24 at the remote end, as shown in FIG. 6C, or that there is a shorted condition in the connecting medium 24.

As described above, the power apparatus 26 is capable of discovering a variety of powerability conditions of the computer network, i.e., of the system 20. In one arrangement, the power apparatus 26 includes an output device (e.g., an LED display) that indicates the detection of particular powerability conditions (i.e., the conditions of FIGS. 6A, 6B and 6C) of the computer network. Further details of the invention will now be provided with reference to FIG. 7 which shows an implementation of the invention in a particular network topology (e.g., a hub-and-spoke configuration).

Figure 7:
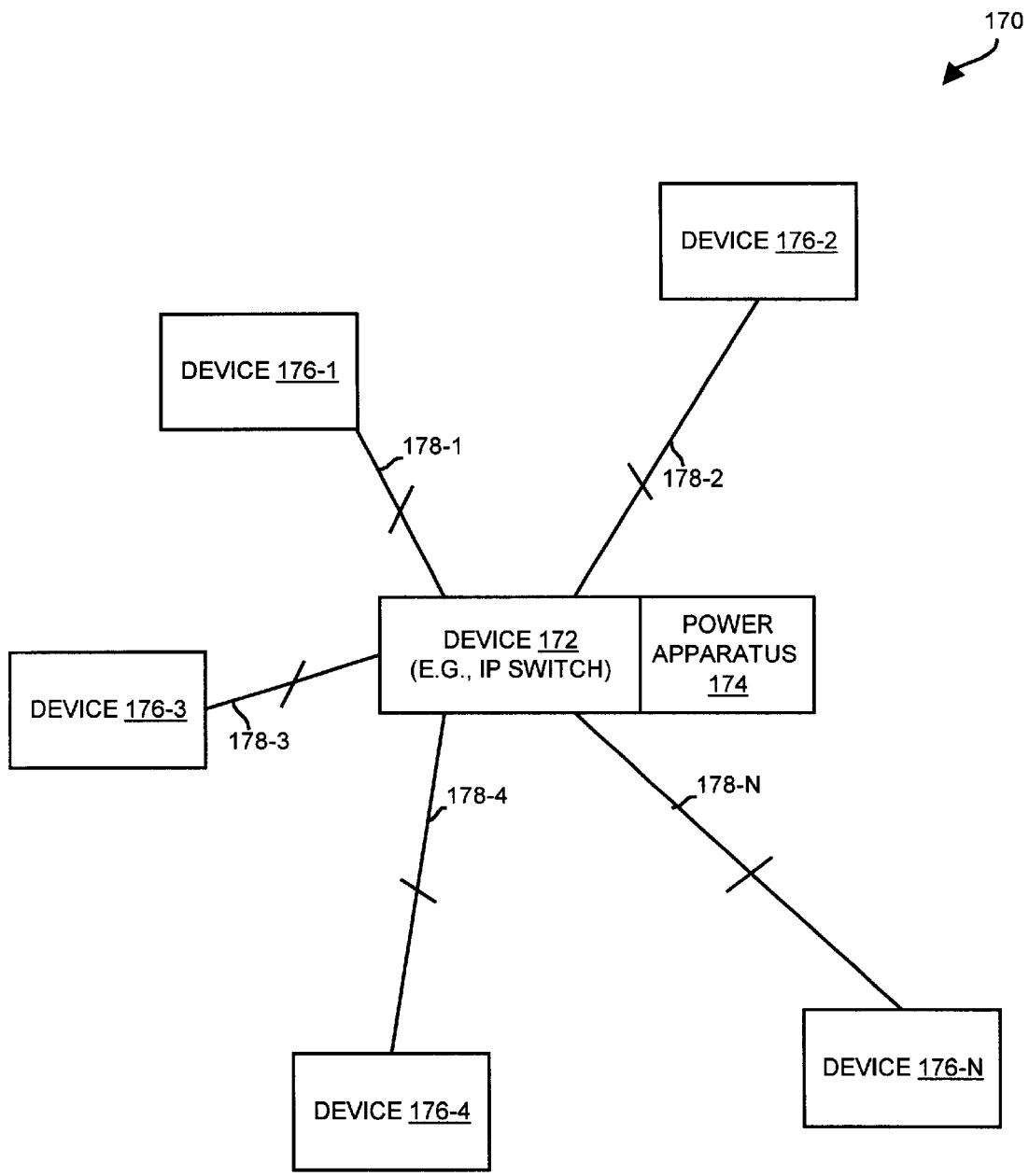
FIG. 7 is a block diagram showing a component arrangement having a remote powerability system of FIG. 1.

FIG. 7 shows a computer network 170 having a data communications device 172 (e.g., an IP switch) and associated power apparatus 174 which connect with multiple devices 176-1, . . . , 176-N (collectively, devices 176) through connecting media 178-1, . . . , 178-N (collectively, connecting media 178). The power apparatus 174 performs the procedure 40 for each connecting medium 178 to determine whether to provide power to that connecting medium 178 (e.g., in a round robin or other multiplexed manner). If the power apparatus 174 discovers that a remotely powerable device connects to a remote end of a particular connecting medium 178, the power apparatus 174 provides power remotely to that device 178 (phantom power). Otherwise, the power apparatus 174 does not provide remote power (to avoid damaging non-remotely powerable devices) and waits a predetermined period of time (e.g., one to two minutes) and then rechecks that connecting medium 178 (see procedure 40 in FIG. 2). For the devices 176 that are remotely powered by the power apparatus 174 or have their own power sources (e.g., local power sources), the data communications device 172 communicates with those devices 176 over the respective connecting media 178. Accordingly, the computer network 170 enables data communications between devices and safe application of remote power without risking damage to non-remotely powerable devices.

As described above, the invention is directed to techniques for discovering a powerability condition of a computer network such as the existence of a remotely powerable device attached to a connecting medium of the computer network. Such detection can then determine whether a remote power source (e.g., a data communications device such as a switch) provides remote power (e.g., phantom power) to the computer network. In particular, if it is determined that a remotely powerable device is attached to the computer network, the remote power source can provide power to the device remotely (e.g., through the connecting medium). However, if no remotely powerable device is discovered, the remote power source can avoid providing power remotely and thus avoid possibly damaging any non-remotely powerable device on the computer network.

The invention leverages off of asymmetrical behavior of a remote device. If the application of stimuli to a computer network, which possibly has a remote device connected thereto, results in expected behavior, power can be safely applied to the remote device. However, if the behavior is not as expected, power can be withheld and the unexpected behavior can be identified. The features of the invention may be particularly useful in computerized devices manufactured by Cisco Systems, Inc. of San Jose, Calif.

While this invention has been particularly shown and described with references to preferred embodiments thereof, it will be understood by those skilled in the art that various changes in form and details may be made therein without departing from the spirit and scope of the invention as defined by the appended claims.

For example, step 48 of the procedure 40 of FIG. 2 describes the power apparatus 26 as providing power indefinitely to a remotely powerable device through the connecting medium 24. As an alternative, the power apparatus 26 can intermittently confirm that the remotely powerable device is still connected to the remote end of the connecting medium 24. This alternative minimizes possible damage if the remotely powerable device is replaced with a non-remotely powerable device.

Additionally, it should be understood that the devices 22-A, 152 and 176 can be a variety of communications devices such as IP phones, security/surveillance devices, etc. which are capable of drawing power remotely. A powerability indicator (e.g., the diode 70 and the resistor 72 series connected between centertaps 68 of the transformers 64-A, 66-A) within each remotely powerable device provides an indication back to a remote power source (e.g., the power apparatus 26) that the device is remotely powerable.

Moreover, it should be understood that the devices 22-B, 172 can be a variety of communications devices as well such as Voice over IP (VoIP) switches, IP switches, hubs, routers, bridges, etc. The devices 22-B, 172 can form a single device with the power apparatus 26, 174 or reside separately from the power apparatus 26, 174. In one arrangement, the device 22-B, 172 is older equipment, and the power apparatus 26, 174 connects the older equipment as an ancillary box.

Furthermore, it should be understood that FIG. 4 shows the power apparatus 26 applying −5 volts to the connecting medium 24 (step 102) and then applying +5 volts to the connecting medium 24 (step 108), by way of example only. In another arrangement, the power apparatus 26 applies +5 volts to the connecting medium 24 before applying −5 volts. In either arrangement, the power apparatus 26 indicates that a remotely powerable device connects to the remote end of the connecting medium 24 when the application of the +5 volts results in current flow, and the application of −5 volts results in no current flow (as measured in steps 104 and 110). Of course, the system 20 can be reconfigured to indicate that a remotely powerable device connects to the remote end of the connecting medium 24 when the application of the −5 volts results in current flow, and the application of +5 volts results in no current flow. Such modifications are intended to be within the scope of the invention.

Additionally, it should be understood that the invention is suitable for use in network topologies other than the hub-and spoke configuration of FIG. 7. For example, the invention can be implemented in ring configurations that use point-to-point connections and terminations between devices, and other configurations.

Furthermore, it should be understood that the power apparatus 26 can be configured to apply power to a remote device upon detection of a reverse-wired remotely powerable device. For example, upon detection of the reverse-wired remotely powerable device 22-A of FIG. 6B, the power apparatus 26 can be configured to provide power in a manner that enables the reverse-wired remotely powerable device 22-A to nevertheless operate properly.

What is claimed is:

1. A method for discovering a powerability condition of a computer network, the method comprising the steps of:

providing a test signal to differential signal lines of a connecting medium of the computer network;

measuring a response signal from the differential signal lines of the connecting medium of the computer network; and indicating whether a remotely powerable device connects to the connecting medium of the computer network based on the response signal;

wherein the step of providing the test signal includes the steps of:

supplying, to the connecting medium, a first voltage during a first time period; and supplying, to the connecting medium, a second voltage that is substantially different than the first voltage during a second time period;

wherein the step of supplying the first voltage includes the step of:

applying one of a positive and negative test voltage to the connecting medium; and wherein the step of supplying the second voltage includes the step of:

applying the other of the positive and negative test voltage to the connecting medium.

2. The method of claim 1 wherein the computer network supports connection of a remotely powerable device that receives, during normal operation, an operating voltage having a first voltage magnitude; and wherein the step of providing the test signal includes the step of:

supplying, as the test signal, a test voltage having a second voltage magnitude that is substantially less than the first voltage magnitude.

3. The method of claim 1 wherein the connecting medium includes a local end and a remote end, and wherein the step of indicating includes the step of:

selectively identifying, through the local end of the connecting medium, one of (i) a backwards wired device condition at the remote end, (ii) an open condition at the remote end, (iii) a remotely powerable device condition at the remote end, and (iv) a shorted/non-powerable device condition at the remote end.

4. The method of claim 1 wherein the differential signal lines of the connecting medium include a first pair of differential signal lines configured to carry data signals between network devices and a second pair of differential signal lines configured to carry other data signals between the network devices, and wherein the step of providing the test signal includes the step of:

applying a DC voltage across the first and second pairs of differential signal lines.

5. The method of claim 4 wherein the step of applying the DC voltage includes the step of:

coupling a signal generator between a centertap of the first pair of differential signal lines and a centertap of the second pair of differential signal lines.

6. The method of claim 4, further comprising the step of:

providing remote power to the computer network through the first and second pairs of differential signal lines to remotely power a device.

7. A method for discovering a powerability condition of a computer network, the method comprising the steps of:

providing a test signal to a connecting medium of the computer network;

measuring a response signal from the connecting medium of the computer network; and indicating whether a remotely powerable device connects to the connecting medium of the computer network based on the response signal, wherein the connecting medium includes (i) a first connecting link having a local end that terminates at a first transformer and a remote end, and (ii) a second connecting link having a local end that terminates at a second transformer and a remote end; and wherein the step of providing the test signal includes the step of:

applying the test signal to the connecting medium through a centertap of the first transformer and a centertap of the second transformer.

8. An apparatus for discovering a powerability condition of a computer network, comprising:

a controller;

a signal generator coupled to the controller; and a detector coupled to the controller, the controller (i) configuring the signal generator to provide a test signal to differential signal lines of a connecting medium of the computer network, (ii) configuring the detector to measure a response signal from the differential signal lines of the connecting medium of the computer network, and (iii) indicating whether a remotely powerable device connects to the connecting medium of the computer network based on the response signal;

wherein the controller, when configuring the signal generator to provide the test signal, configures the signal generator to supply to the connecting medium, (i) a first voltage during a first time period, and (ii) a second voltage that is substantially different than the first voltage during a second time period; and wherein the controller configures the signal generator to apply one of a positive and negative test voltage to the connecting medium as the first voltage, and the other of the positive and negative test voltage to the connecting medium as the second voltage.

9. The apparatus of claim 8 wherein the computer network supports connection of a remotely powerable device that receives, during normal operation, an operating voltage having a first voltage magnitude; and wherein the controller configures the signal generator to supply, as the test signal, a test voltage having a second voltage magnitude that is substantially less than the first voltage magnitude.

10. The apparatus of claim 8 wherein the connecting medium includes a local end and a remote end, and wherein the controller selectively identifies, through the local end of the connecting medium, one of (i) a backwards wired device condition at the remote end, (ii) an open condition at the remote end, (iii) a remotely powerable device condition at the remote end, and (iv) a shorted/non-powerable device condition at the remote end.

11. The apparatus of claim 8 wherein the differential signal lines of the connecting medium include a first pair of differential signal lines configured to carry data signals between network devices and a second pair of differential signal lines configured to carry other data signals between the network devices; and wherein the controller, when configuring the signal generator to provide the test signal, is configured to:

direct the signal generator to apply a DC voltage across the first and second pairs of differential signal lines.

12. The apparatus of claim 11 wherein the controller, when directing the signal generator to apply the DC voltage across the first and second pairs of differential signal lines, is configured to:

couple the signal generator between a centertap of the first pair of differential signal lines and a centertap of the second pair of differential signal lines.

13. The apparatus of claim 11 wherein the controller is further configured to:

direct the signal generator to provide remote power to the computer network through the first and second pairs of differential signal lines to remotely power a device.

14. An apparatus for discovering a powerability condition of a computer network, comprising:

a controller;

a signal generator coupled to the controller; and a detector coupled to the controller, the controller (i) configuring the signal generator to provide a test signal to a connecting medium of the computer network, (ii) configuring the detector to measure a response signal from the connecting medium of the computer network, and (iii) indicating whether a remotely powerable device connects to the connecting medium of the computer network based on the response signal, wherein the connecting medium includes (i) a first connecting link having a local end that terminates at a first transformer and a remote end, and (ii) a second connecting link having a local end that terminates at a second transformer and a remote end; and wherein the controller configures the signal generator to apply the test signal to the connecting medium through a centertap of the first transformer and a centertap of the second transformer.

15. A method for discovering a powerability condition of a computer network, the method comprising the steps of:

providing a test signal to differential signal lines of a connecting medium of the computer network;

measuring a response signal from the differential signal lines of the connecting medium of the computer network; and determining whether a backwards-wired remotely powerable device connects to the connecting medium of the computer network based on the response signal, and when it is determined that a backwards-wired remotely powerable device connects to the connecting medium, applying power to the backwards-wired remotely powerable device.

* * * * *